(12) United States Patent
Dupont et al.

(10) Patent No.: US 7,702,062 B2
(45) Date of Patent: Apr. 20, 2010

(54) ELECTRONIC SENSOR WITH OPTIMIZED COUNTING CAPACITY

(75) Inventors: Bertrand Dupont, Grenoble (FR); Patrick Villard, La Trenche (FR); Gilles Chamming's, Grenoble (FR); Jean-Luc Martin, St Geoire En Valdaine (FR)

(73) Assignee: Commissariat a l'Energie Atomique, Paris (FR)

( * ) Notice: Subject to any disclaimer, the term of this patent is extended or adjusted under 35 U.S.C. 154(b) by 61 days.

(21) Appl. No.: 12/080,823

(22) Filed: Apr. 4, 2008

(65) Prior Publication Data

US 2008/0253498 A1    Oct. 16, 2008

(30) Foreign Application Priority Data

Apr. 6, 2007    (FR)    .................................. 07 54383

(51) Int. Cl.
*H03K 23/00* (2006.01)
(52) U.S. Cl. ...................................... 377/118; 377/111
(58) Field of Classification Search .................. None
See application file for complete search history.

(56) References Cited

U.S. PATENT DOCUMENTS

| | | | | |
|---|---|---|---|---|
| 3,936,629 A | * | 2/1976 | Desvignes | ............... 250/206.2 |
| 4,276,468 A | * | 6/1981 | Nagamoto et al. | ............. 377/2 |
| 6,444,983 B1 | | 9/2002 | McManus et al. | |
| 7,327,248 B2 | * | 2/2008 | Odenwald et al. | ........... 340/517 |
| 2002/0190208 A1 | | 12/2002 | Wood | |

OTHER PUBLICATIONS

French Preliminary Search Report, FR 0754383, dated Jan. 14, 2008.
European Search Report, EP 08154046, dated May 19, 2008.

* cited by examiner

*Primary Examiner*—Cassandra Cox
(74) *Attorney, Agent, or Firm*—Nixon Peabody LLP (57) ABSTRACT

Embodiments of the present disclosure relate to an electronic sensor including capture means producing a signals comprising x pulses during a given capture time, such that a'<x<b', wherein a', b' and x are non-null natural integers, and counting means receiving the signals, which are incremented with each pulse received, including a maximum counting capacity equal to z such that (b'−a')≦z<a', where z is a non-null natural integer, resetting the counting, when the maximum counting capacity z is exceeded and outputting, at the end of the capture time, a number representative of the number of pulses x of the signals, wherein a' is the minimum value and b' is the maximum value of the number of pulses that can be produced by the capture means.

15 Claims, 4 Drawing Sheets

ELECTRONIC SENSOR WITH OPTIMIZED COUNTING CAPACITY

CROSS REFERENCE TO RELATED APPLICATIONS or PRIORITY CLAIM

This application claims priority to French Patent Application No. 07 54383, filed Apr. 6, 2007.

FIELD OF THE INVENTION AND STATE OF THE RELATED ART

The invention relates to the field of sensors comprising digital or analogue counters. The invention is particularly suitable for use as part of a bolometer reading circuit, for example in an infrared image sensor pixel.

Figure 1:
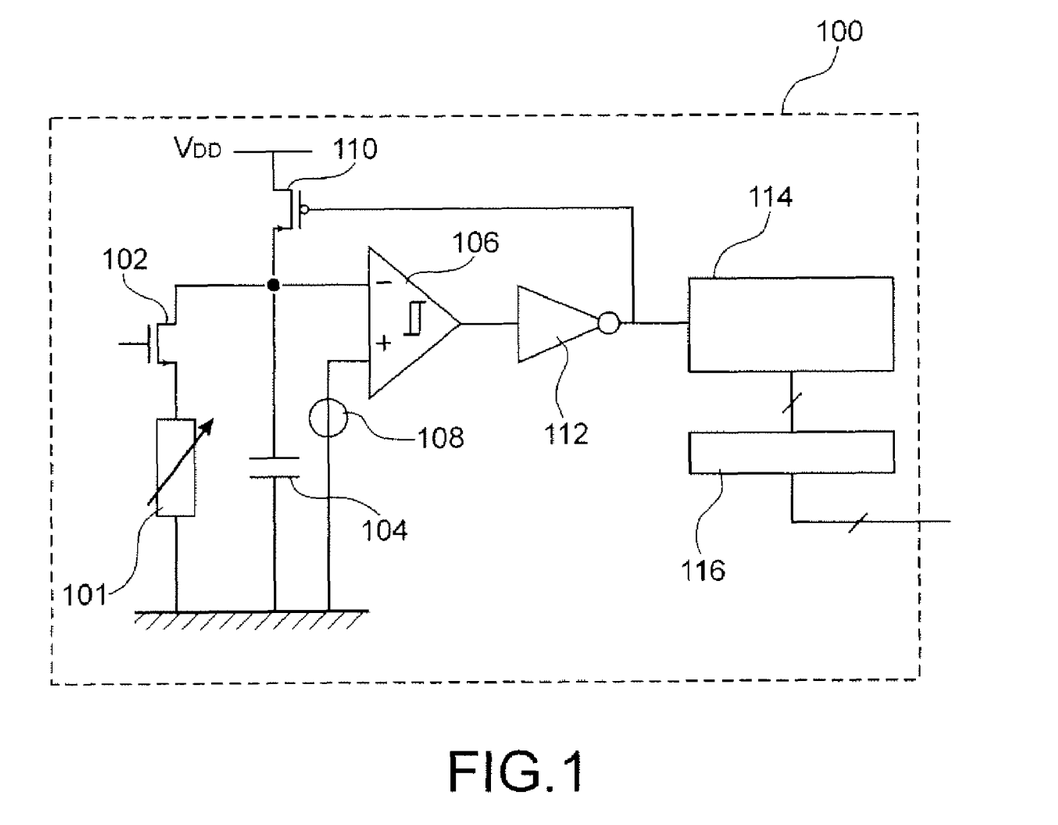
FIG. 1 represents a bolometer and reading circuit of said bolometer which comprises a counter.

FIG. 1 represents a part of a sensor 100 comprising a reading circuit of a bolometer 101. Said bolometer 101 may for example be a thermistor, i.e. a resistance varying with the temperature, located on a pixel of an infrared image sensor, the reading circuit belonging to the signal processing assembly of the bolometer 101.

When applying a fixed voltage to the terminals of the bolometer 101, the temperature variations detected by the bolometer 101 affect the value of the resistance of same and therefore, the value of the current flowing therethrough.

The reading circuit converts the current of the bolometer 101 into a signal comprising a series of pulses, the frequency of the pulses being proportional to the current of the bolometer 101. The pulses are then counted for a counting time corresponding to a capture or measurement time by the bolometer. The number of pulses counted is output from the reading circuit, said number being representative of the current flowing in the bolometer 101.

For this, the reading circuit comprises an NMOS selection transistor 102 wherein the source is connected to the bolometer 101, the bolometer also being connected to the ground. A polarisation voltage Vg is applied on the grid of the NMOS transistor 102. The voltage Vg being constant throughout the capture time, the voltage at the terminals of the bolometer 101 is also constant. In this way, when the temperature varies, the resistance of the bolometer 101 changes, which implies, in view of the constant voltage at the terminals of the bolometer 101, a variation of the current flowing therethrough. This current is drawn into an integration capacitor 104, causing the voltage to fall at the terminals of said capacitor 104. The voltage at the terminals of the capacitor 104 is applied to an inverting input of a comparator 106. A non-inverting input of the comparator 106 is connected to a voltage generator 108 applying a reference voltage $V_{ref}$, for example 2V for a voltage Vg of the order of 1.7 V. A "recharging" PMOS transistor 110 is positioned between the non-inverting input of the comparator 106 and a power supply voltage Vdd, for example equal to 3.3 V. The PMOS transistor 110 and the capacitor 104 are thus positioned in series between the ground and the power supply voltage Vdd. An inverter 112 is positioned between the output of the comparator 106 and the grid of the PMOS transistor 110.

Prior to the capture, or measurement, the capacitor 104 is "precharged" at the power supply voltage Vdd, for example by means of a precharging PMOS transistor, not shown, connected to the power supply voltage Vdd. When the capture starts, the voltage at the terminals of the capacitor 104 is substantially equal to the power supply voltage Vdd, and then declines progressively during capture. When the potential applied to the inverting input of the comparator 106, i.e. the voltage at the terminals of the capacitor 104, reaches $V_{ref}$, the comparator 106 switches and the PMOS transistor 110 changes to the conducting state, resulting in the recharging of the capacitor 104. The comparator 106 is for example a hysteresis comparator, so that the capacitor 104 can be recharged completely, substantially up to Vdd, before it switches to the opposite direction after a certain time delay. During this first cycle, by means of the discharging and recharging of the capacitor 104, a pulse was generated at the output of the comparator 106.

The output of the inverter 112 is connected to a counter 114 which is incremented for each pulse received. In this way, the number of pulses generated at the output of the comparator 106 and counted by the counter 114 during a determined capture period, or counting period, t is representative of the variation of the resistance of the bolometer 101, and therefore of the temperature variation induced by the infrared radiation on the bolometer 101. The circuit 100 also comprises storage means 116 connected to the output of the counter 114. These storage means 116 are provided to store the number of pulses counted by the counter 104 at the end of the capture period.

Figure 2:
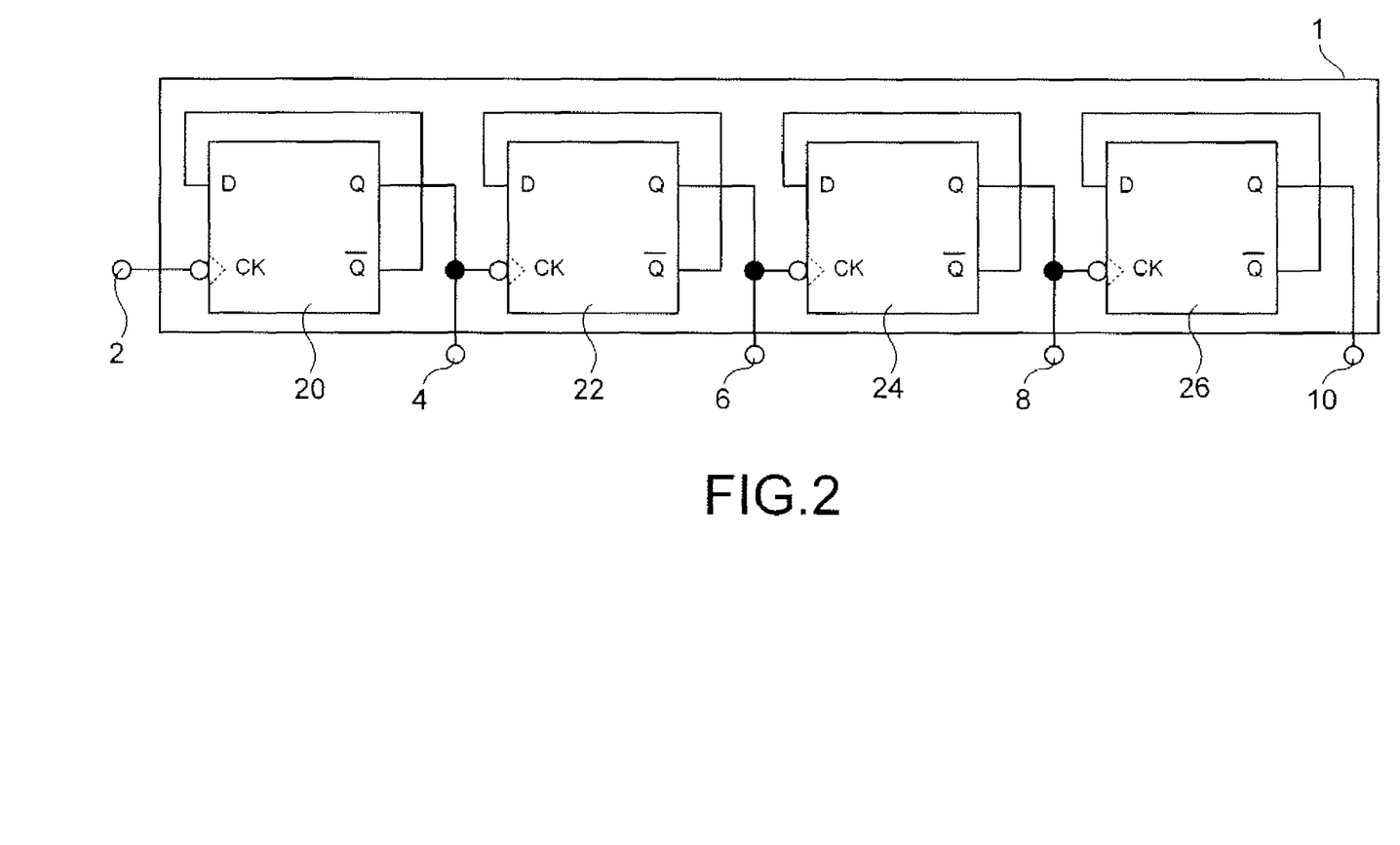
FIG. 2 represents an asynchronous logical counter.

The counter 114 may for example by an asynchronous logical counter 1, produced from bistable circuits D, as shown in FIG. 2. The counter 1 comprises an input 2 whereon the pulses generated at the output of the comparator 102 are applied. This input 2 is connected to a clock input of a first bistable circuit D 20. The output of said first bistable circuit D 20 is connected to a clock input of a second bistable circuit D 22 and to a first output 4 of the counter 1. Similarly, a third and fourth bistable circuits D, respectively 24 and 26, are connected in series with the first and the second bistable circuits D 20 and 22, the outputs of the second, third and fourth bistable circuits D being connected to the second, third and fourth outputs, respectively 6, 8 and 10, of the counter 1.

When it is desired to count the number of pulses contained in a signal during a counting time t, and said signal comprises for example a maximum number Y of pulses during the time t, the counter used is an n-bit counter where $2^{(n-1)} \leq Y < 2^n$. In the example in FIG. 2, the counter 1 is a four-bit counter, i.e. outputting a binary digital signal on four bits. Therefore, the counter 1 is capable of counting the number of pulses of a signal comprising not more than 15 pulses during the counting time t (as $2^3 \leq 15 < 2^4$).

It is also possible to use an analogue counter 114 to count the Y pulses of the signal during the counting time t. The analogue counter then comprises a capacitor with a capacity $C_1$ making it possible to count the total number of pulses of the signal. For example, if a pulse implies the storage of a number of charges $q_1$ in the capacitor, the capacity $C_1$ is selected so as to be able to store all the charges, wherein the number is equal to $Y \times q_1$.

However, the use of such analogue or digital counters may pose a space requirement problem in some applications. For example, in an infrared image sensor comprising several pixels, each pixel comprises a bolometer and a reading circuit which includes a counter, for example a 16-bit digital counter, occupying a large amount of space on each pixel.

DESCRIPTION OF THE INVENTION

Thus there is a need to reduce the size of a sensor and to improve the sensitivity of a sensor.

For this purpose, one embodiment proposes an electronic sensor comprising at least:

capture means producing a signal s comprising x pulses during a given capture time, such that a'<x<b', where a', b' and x are non-null natural integers, counting means receiving the signal s, which are incremented with each pulse received, comprising a maximum counting capacity equal to z such that (b'−a')≦z<a', where z is a non-null natural integer, resetting the counting, i.e. restarting counting from 0, when the maximum counting capacity z is exceeded and outputting, at the end of the capture time, the number of pulses counted which is representative of the number of pulses x of the signal s.

In this way, the sensor makes it possible to carry out digital levelling of the signal s only accounting for the necessary information and not accounting for the offset value of the number of pulses x of the signal s, i.e. the pulses output before the a'-th pulse.

The capture means may comprise at least one bolometer whereby the signal s may be obtained.

In a first alternative embodiment, the counting means may comprise at least one analogue counter. In this case, the analogue counter may comprise at least one capacitor, where the maximum counting capacity z may be proportional to the value of the capacity of the capacitor, where the number output from the counting means may be a voltage at the terminals of the capacitor.

The analogue counter may also comprise:
a comparator that may comprise a first input connected, or coupled, to application means, or a generator, of a reference voltage, a second input connected, or coupled, to the capacitor and an output connected, or coupled, to a first input of an OR logical gate, where a second input of the OR logical gate may be intended to receive a counting reset signal,
a reset transistor of the capacitor wherein the grid may be connected, or coupled, to the output of the OR logical gate,
a counting transistor wherein the drain may be connected, or coupled, to the second input of the comparator and the grid may be connected, or coupled, to the input of the counting means.

The analogue counter may also comprise an inverter arranged between the output of the comparator and the first input of the OR logical gate.

In a second alternative embodiment, the counting means may comprise at least one digital counter.

The digital counter may comprise k bits such that $2^k=z$, where k may be selected such that $m \leq k < n$, where:

$$m = n - c,$$

where n may be determined by the equation $2^{n-1} \leq (b+d) < 2^n$, where c may be determined by the equation $$2^c \leq \frac{2^n}{(b-a)+2d} < 2^{c+1},$$

where a, b, c, d, k, m and n are non-null natural integers, d corresponding to the variations in the number of pulses of ±d due to technological dispersions of some components of the sensor, a=a'+d and b=b'−d.

The capture means may comprise at least:
comparison means liable to comprise a first input connected, or coupled, to a capacitor, a second input connected, or coupled, to application means, or a generator, of a reference voltage and an output whereon the signal s is output,
a recharging transistor wherein the grid may be connected, or coupled, to the output of the comparator and the drain may be connected, or coupled, to the first input of the comparator,
a selection transistor wherein the drain may be connected, or coupled, to the first input of the comparator, the source being connected, or coupled, to a variable load, where a polarisation voltage may be applied to the selection transistor grid.

The comparator of the capture means may include a hysteresis comparator.

The variable load may be a thermistor, such as the bolometer when the capture means comprise a bolometer.

The comparison means of the capture means may comprise a comparator followed by an inverter, the comparator receiving the reference voltage on its positive input, where the recharging transistor grid and the counter input may be connected, or coupled, to the inverter output.

The sensor may comprise a bolometer reading circuit.

Another embodiment also relates to an infrared image sensor, liable to comprise a plurality of pixels, where each pixel may comprise at least one sensor as described above. Given that, in such a sensor, the surface strains are very high, this embodiment makes it possible to save a significant surface area using a smaller counter than in the bolometer reading circuits already used.

Another embodiment also relates to a counting method of the number of pulses x of a signal s produced by an electronic sensor for a given capture time, such that a'<x<b', where a', b' and x are non-null natural integers, comprising at least the following steps:
applying the signal s to an input of counting means comprising a maximum counting capacity equal to z such that (b'−a')≦z<a', where z is a non-null natural integer,
incrementing the counting means with each pulse received on the input and resetting the counting when the maximum counting capacity z is exceeded,
outputting from the counting means the number which is representative of the number of pulses x of the signal s.

BRIEF DESCRIPTION OF THE FIGURES

The present invention will be understood more clearly on reading the description of examples of embodiments given purely as an indication and which are in no way exhaustive, with reference to the appended figures wherein.

Identical, similar or equivalent parts of the various figures described below have the same numerical reference so as to facilitate switching from one figure to another.

The various parts shown in the figures are not necessarily represented according to a uniform scale, in order to make the figures more legible.

The various possibilities (alternative embodiments and embodiments) should be understood as not being mutually exclusive and may be combined with each other.

DETAILED DESCRIPTION OF SPECIFIC EMBODIMENTS

Reference is made first to FIG. 1 describing a sensor 100 comprising a reading circuit of a bolometer 101.

As described above, the value of the current flowing in the bolometer 101 is associated with the value of the temperature captured by the bolometer 101. The variations of the current value associated with the temperature fluctuations are very low, for example equal to approximately 1% of the current value flowing through the bolometer 101, for example in the case of a capture of an image by infrared radiation. Therefore, the current flowing through the bolometer 101 comprises a high polarisation current, or offset current, not providing any information on the temperature measured, and the current value flowing through the bolometer 101 varies little around this offset current, the variation being representative of the temperature variation measured by the bolometer 101 with respect to a reference temperature.

The counter 114 may be a digital counter, for example consisting of bistable circuits D such as the asynchronous logical counter 1 represented in FIG. 2, or an analogue counter. Therefore, a sensor comprising a digital counter 114 will firstly be considered.

A bolometer reading circuit according to the prior art comprises an n-bit counter, where n is such that, for a signal obtained at the comparator output comprising for example a maximum number Y of pulses during the counting time t, the equation $2^{(n-1)} \leq Y < 2^n$ is applicable.

According to a first embodiment, the counter 114 comprises a number of bits k which is less than the number of bits n as defined above. During the capture time, the counter 114 is voluntarily allowed to "overflow", i.e. when the counter reaches its maximum counting value, said counter restarts counting from 0 while the total pulse count has not been completed. The counter thus carries out several counting cycles, the first counting cycle starting after the reset of the capacitor 104 by the precharging transistor 110, and the subsequent counting cycle(s) starting after each reset of the counter 114 following an "overflow" of the counter. As it will emerge below, the completion of several counting cycles does not induce information loss when some conditions are verified. The number of bits k is in particular greater than or equal to a minimum number of bits m as defined below.

The number of overflows, or number of counting resets, $n_d$ is such that $2^{(n-k)-1} \leq n_d \leq 2^{(n-k)}-1$. In this way, if n-k is equal to 2, there are 2 or 3 overflows of the counter, or in other words 3 or 4 counting cycles. These voluntary overflows make it possible to level, i.e. eliminate the offset, or the number of pulses, not representing the temperature variation measured by the bolometer 101.

The minimum number of bits m that may be comprised by the counter 114 is obtained in view of the dynamic range of the signal to be quantified, i.e. in view of the minimum and maximum numbers of pulses to be counted for a capture time.

More specifically, for a reference temperature $T_{ref}$, the number of pulses produced by the sensor during the capture is equal to a number $n_{ref}$ which is a function of the polarisation current flowing through the bolometer 101 and the reference voltage $V_{ref}$ applied at the input of the comparator 106. When the temperature measured by the bolometer 101 varies with respect to $T_{ref}$, within a temperature range between $T_1$ and $T_2$ including $T_{ref}$, the number of pulses produced by the comparator 106 varies within a range defined by terminals a and b, where a and b are non-null natural integers and a<b, including $n_{ref}$. Moreover, independently of the variations associated with the temperature, the number of pulses produced by the comparator 106 may vary due to the technological dispersions of the components of the sensor 100, and particularly of the bolometer 1001 and the capacitor 104 with respect to standard design values of such components, in a standard environment. In this way, the number of pulses produced by the comparator 106 may fluctuate by more or less d pulses, where d is a positive integer, due to these technological dispersions. Overall, the number of pulses produced by the comparator 106 is between a' and b' such that a'=a−d and b'=b+d, where a' and b' are positive integers.

As a general rule, it is possible to determine the minimum number of bits m of a digital counter to count the number of pulses of a signal s comprising x pulses during a counting time t, such that a−d<x<b+d, where:

$$m = n - c,$$

where n is determined by the equation:

$$2^{n-1} \leq (b+d) < 2^n \quad (1),$$

where c is determined by the equation:

$$2^c \leq \frac{2^n}{(b-a)+2d} < 2^{c+1}, \quad (2)$$

where a, b, c, d, m, n and x are non-null natural integers.

The number n defines the minimum number of bits required for a counter according to the prior art comprising a single counting cycle, with no overflows of the counter during the capture period.

The number c defines the maximum number of bits that can be "saved" in a sensor according to the first embodiment.

In this example of an embodiment, an increase in the temperature of 50 K with respect to a reference temperature represents an increase of 1.2% of the total current flowing in the bolometer 101 which is then converted by the comparator 106 into pulses. To this effective current carrying the temperature variation information, the variations of the current associated with the technological dispersions of the bolometer 101 and the reading circuit components (particularly those of the capacitor 104), which in this case corresponds to approximately ±10% of the polarisation current, are added.

Therefore, it is possible to obtain current values ranging from 90% to 111.2% of the reference polarisation current obtained for the reference temperature Tref with no technological dispersions, this variation range being applied directly to the number of pulses obtained at the output of the comparator 106. In this example, the range [a; b] of current values corresponds to the range [100%; 101.2%] of the reference polarisation current. The number of pulses d corresponds to a 10% variation of the reference polarisation current. The total variation range of the number of pulses [(a−d); (b+d)] corresponds to the range [90%; 111.2%] of the reference polarisation current.

Figure 3A:
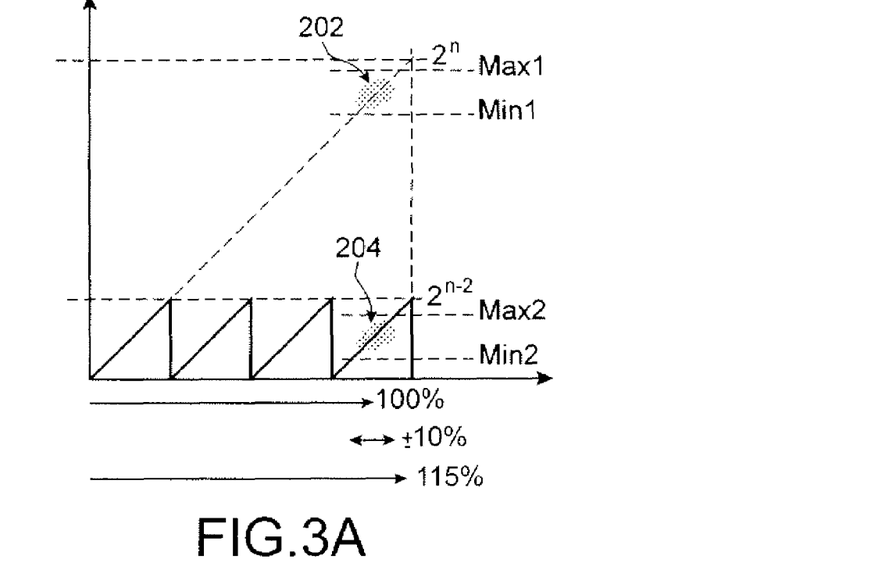
FIGS. 3A and 3B represent behaviours of digital counters with n bits and with n−2 bits during the same counting time.

FIG. 3A represents the behaviours of a first set of sensors including counters comprising n bits and a second set of sensors including counters comprising m bits, where m=n−2, during a pulse count, the Y-axis representing the number specified by the counter at the end of the counting time, the X-axis representing the number of pulses supplied by the comparator during the counting time. The points 202 represent the various values specified by the n-bit counters after a determined capture time. The points 204 represent the various values of the (n−2)-bit counters for the same capture time. It is assumed for each set of sensors that the technological dispersions and the temperature variations detected by the various sensors in this set are identical. Therefore, it is considered that the numbers of pulses output from the comparators of a set are statistically identical to those of the other set. It can be seen in FIG. 3A that the (n−2)-bit counters have seen three overflows of their maximum counting capacity during the counting period, the measurements being made during the fourth counter cycle. For these two sets of counters, the points are dispersed around a value that is controlled: in fact, the choice of the grid voltage Vg of the NMOS selection transistor 102 makes it possible to determine the mean current flowing in the bolometer 101 and therefore the mean value of the counter at the end of the capture time. Finally, the points 202 and 204 have ordinates between two boundary values Min1/Max1 and Min2/Max2 representing the minimum and maximum numbers of pulses given by the comparator, i.e. the possible variations of the current flowing in the bolometer 101. It should be noted that the deviation of the values of each set of points 202 and 204, i.e. (Max1−Min1) of the points 202 and (Max2−Min2) of the points 204, is identical. As a result, the sensitivity, or resolution, of the n-bit sensors is identical to that of the (n−2)-bit sensors according to the first embodiment.

In the example described above where the technological dispersions represent ±10% of the reference signal (signal obtained by measuring $T_{ref}$, with no technological dispersions), whereto a variation ranging from 0 to 1.2% as a function of the temperature measured is added, it is possible to define, for an n-bit counter covering up to 115% of the reference signal, the maximum number of bits c that can be saved by an equation similar to the abovementioned equation (2).

The ratio: $\frac{100}{((1.2-0)+2\times10)} = 5.42$ is between $2^c$ and $2^{(c+1)}$. Now, we have the equation $2^2<5.42<2^3$. Therefore, it can be deduced, using the method detailed above, that it is possible to "save" 2 bits, i.e. use a counter with m bits, where m=n−2, as is the case in FIG. 3A. For example, in the case of an infrared image sensor comprising in each pixel a bolometer and a digital counter reading circuit, it is possible to use, not a 16-bit counter as in the infrared image sensors according to the prior art, but a 14-bit counter without losing information on the temperatures measured.

FIG. 3A represents the scenario where, with a counter capable of quantifying all the pulses, i.e. comprising n bits, the value Max1 of the number of pulses counted is close to the value $2^n$. It can be seen in this case, for the counter with m=n−2 bits, all the counting values are in the same counting cycle.

Figure 3B:
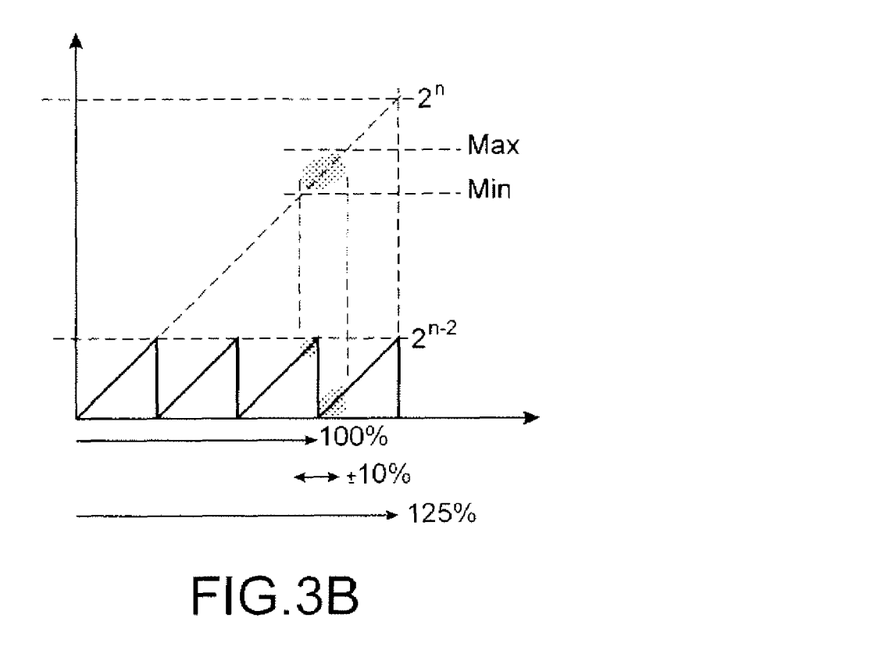

The gain in number of bits generated does not imply that the values dispersed at the end of the capture time are in the same counting cycle of an n−2 bit counter. It can be envisaged that part of the counting values is in one cycle, while the other part is in the subsequent cycle, as demonstrated in FIG. 3B which represents the behaviours of n-bit counters and m-bit counters where m=n−2. If the conditions described above, with reference to equations (1) and (2), are verified, the counting values (in ordinates) obtained on a cycle are different from those obtained on a subsequent cycle. In this way, it is possible to differentiate between these counting values.

In the example given above, m is selected with a value m=n−2. However, this value represents the minimum number of bits of the counter. It is possible for the counter to comprise a greater number of bits, for example m=n−1.

According to a second embodiment, the counter of the sensor comprises a number of bits which is identical to the number of bits n as defined above for a conventional sensor, by the equation $2^{(n-1)} \leq Y \leq 2^n$. However, instead of having a single counting cycle, several counting cycles are performed. For this purpose, the functioning of the sensor is modified so as to increase the number of pulses produced during the capture time. In the example of the reading circuit represented in FIG. 1, it is possible to increase the polarisation voltage Vg of the transistor 102, decrease the capacity of the capacitor 104 and/or increase the voltage Vref, which makes it possible to increase the average number of pulses at the output of the comparator 106. By means of this increase in the number of pulses at the output of the comparator 106, the sensitivity of the sensor is increased. It is thus possible to differentiate between the slightest temperature variations of the bolometer 101.

To ensure that there is no possible overlapping between counter values obtained for different counting cycles, the sensor 100 verifies the following condition: (b'−a')≦z<a', where a' and b' are as defined above, and z is the maximum counting capacity of the counter.

Figure 4:
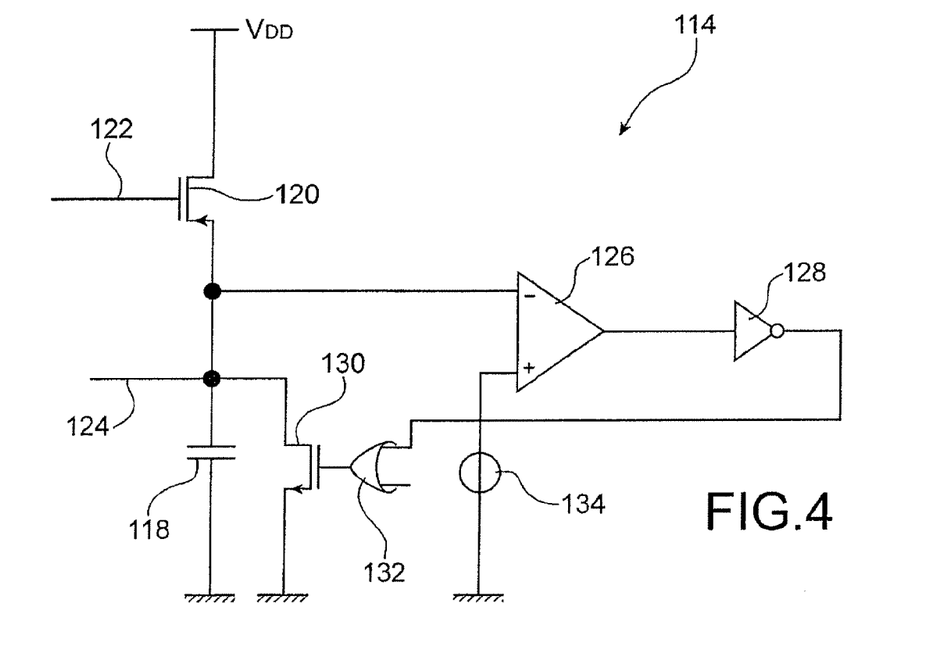
FIG. 4 represents an analogue counter of the bolometer reading circuit in FIG. 1, according to an embodiment.

Irrespective of the embodiment applied, it is possible for the counter 114 to be an analogue counter. An example of such a counter is represented in FIG. 4.

The counter 114 comprises a counting capacitor 118 positioned between the ground and the drain of a PMOS transistor 120. A current source, not shown, is preferentially positioned between the source of the transistor 120 and the power supply voltage. The grid of said PMOS transistor 120 is connected to an input 122 of the counter 114. The drain of the PMOS transistor 120 is also connected to an input, for example the inverting input, of a comparator 126. A second input of the comparator 126 is connected to a voltage generator 134 supplying a reference voltage. The output of the comparator 126 is connected to the input of an inverter 128. The output of said inverter 128 is connected to an input of an OR logical gate 132. Another input of the OR logical gate 132 makes it possible, by applying a reset signal to this input, to discharge the capacitor 118 and therefore reset the counting. The output of the OR logical gate 132 is connected to the grid of an NMOS transistor 130, the drain of said NMOS transistor 130 being connected to the capacitor 118. The transistor 130 and the capacitor 118 are thus positioned in parallel between the ground and a node 124 forming the output of the counter.

In this way, with each pulse received on the grid of the PMOS 120, it changes to the conducting state, storing a certain quantity of charges, for example referred to as a "packet" and comprising approximately 2000 electrons, in the capacitor 118. The voltage at the terminals of the capacitor 118 being proportional to the quantity of charges stored in the capacitor 118, the number of charging packets represents the number of pulses counted. In view of the charge quantity, or the voltage at the terminals of the capacitor 118, corresponding to a pulse, it is possible to deduce the number of pulses received by measuring the voltage at the terminals of the capacitor 18.

Figure 5:
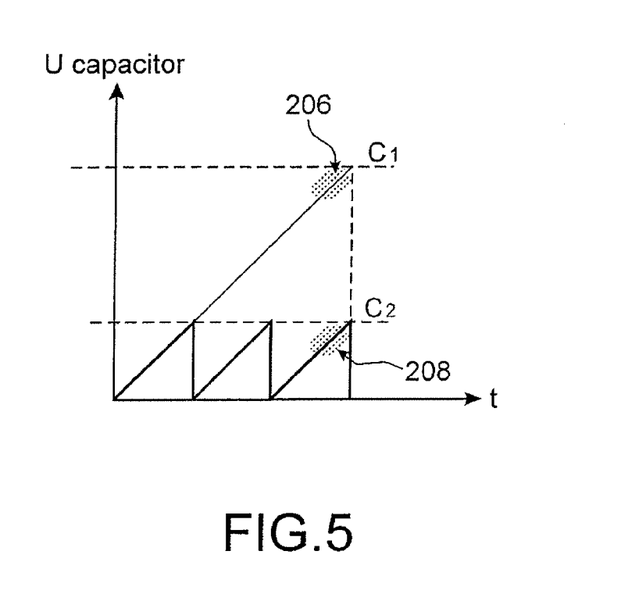
FIG. 5 represents the behaviours of analogue counters with a capacitor with a capacity $C_1$ and analogue counters with a capacitor with a capacity $C_2$, where $C_2 < C_1$.

The comparator 126 compares the voltage at the terminals of the capacitor 118 with the reference voltage, for example equal to approximately 2 V, applied by the voltage generator 134. When the voltage at the terminals of the capacitor 118 reaches the reference voltage, the comparator switches the NMOS 130, discharging the capacitor 118. In this way, as for the digital counter described above, by selecting a lower storage capacity $C_2$ of the capacitor than the storage capacity $C_1$ required to count all the pulses without resetting the count, the count is performed over several charging cycles of the capacitor. As represented in FIG. 5, the points 206 represent voltage values at the terminals of capacitors with a capacity $C_1$ belonging to a first set of sensors. The points 208 represent the voltage values at the terminals of capacitors with a capacity $C_2$ belonging to a second set of sensors for an identical counting time. It can be seen that the capacitors with a capacity $C_2$ were discharged twice, the counting values being in the third cycle of the corresponding counters.

Therefore, it is possible to use a lower capacity while ensuring an identical sensitivity of the sensor. With a signal s comprising x pulses over a counting period t where a'<x<b', and a maximum counting capacity equal to z, where z represents the maximum number of voltage values that can be differentiated at the terminals of the capacitor 118, it is possible to define $C_2$, the minimum capacity of the capacitor to count the pulses with no loss of information. It should be noted that $z = C_2 \times Vdd/\Delta Q$, where $\Delta Q$ corresponds to an elementary charge packet. Moreover, in order to ensure satisfactory differentiation of the counter output levels, $z \geq (b'-a')$. Consequently, the capacity is equal to at least $(b'-a') \times \Delta Q/Vdd$. Moreover, in order to provide at least two counting cycles, or in other words at least one overflow of the counter, z<a', which implies that $C_2 < \Delta Q/Vdd \times a'$.

Moreover, if a capacitor capacity value $C_1$ making it possible to count all the pulses without discharging the capacitor is taken into consideration, the minimum gain on the capacity value is defined according to the following formula:

$$\frac{b'}{(b'-a')} = \frac{C_1}{C_2} \quad (3)$$

Other embodiments may be envisaged. For example, it is possible to envisage a bolometer sensor similar to that shown in FIG. 1, but produced with complementary logic, the selection transistor being in this case a PMOS transistor, the bolometer being connected to the power supply voltage, the recharging transistor being an NMOS transistor, the capacitor being connected to the ground, and so on. Similarly, the counter represented in FIG. 4 may be produced with complementary logic.

The invention claimed is:

1. An electronic sensor, comprising:
   capture means producing a signals comprising x pulses during a given capture time, such that a'<x<b', wherein a', b' and x are non-null natural integers; and
   counting means receiving the signals, which are incremented with each pulse received, comprising a maximum counting capacity equal to z such that (b'-a') $\leq$ z<a', wherein z is a non-null natural integer, resetting the counting, when the maximum counting capacity z is exceeded and outputting, at the end of the capture time, a number representative of the number of pulses x of the signals,
   wherein a' is the minimum value and b' is the maximum value of the number of pulses that can be produced by the capture means.

2. The sensor according to claim 1, wherein the capture means comprises at least one bolometer whereby the signals may be obtained.

3. The sensor according to claim 1, wherein the counting means comprises at least one analogue counter.

4. The sensor according to claim 3, wherein the analogue counter comprises at least one capacitor, wherein the maximum counting capacity z of the counting means is proportional to the value of the capacity of the capacitor, wherein the number output from the counting means is a voltage at the terminals of the capacitor.

5. The sensor according to claim 4, the analogue counter further comprising:
   a comparator comprising a first input coupled to application means of a reference voltage, a second input coupled to the capacitor and an output coupled to a first input of an OR logical gate, a second input of the OR logical gate being intended to receive a counting reset signal;
   a reset transistor of the capacitor wherein the grid may be coupled to the output of the OR logical gate; and
   a counting transistor wherein the drain is coupled to the second input of the comparator and the grid may be coupled to the input of the counting means.

6. The sensor according to claim 5, the analogue counter further comprising:
   an inverter arranged between the output of the comparator and the first input of the OR logical gate.

7. The sensor according to claim 1, wherein the counting means comprises at least one digital counter.

8. The sensor according to claim 7, wherein the digital counter comprises k bits such that $2^k = z$, k being selected such that m$\leq$k<n, wherein; m=n−c wherein n is determined by the equation $2^{n-1} \leq (b+d) < 2^n$, wherein c, is determined by the equation $$2^c \leq \frac{2^n}{(b-a)+2d} < 2^{c+1},$$

and wherein a, b, c, d, k, m and n are non-null natural integers, d corresponding to the variations in the number of pulses of ±d due to technological dispersions of some components of the sensor, a=a'+d and b=b'−d.

9. The sensor according to claim 1, wherein the capture means comprises at least:
   comparison means comprising a first input coupled to a capacitor, a second input coupled to application means of a reference voltage and an output whereon the signals is output,
   a recharging transistor wherein the grid may be coupled to the output of the comparator and the drain may be coupled to the first input of the comparator,
   a selection transistor wherein the drain is coupled to the first input of the comparator, the source coupled to a variable load, a polarisation voltage applied to the selection transistor grid.

10. The sensor according to claim 9, wherein the comparison means includes a hysteresis comparator.

11. The sensor according to claim 9, wherein the variable load is a thermistor, such as the bolometer when the capture means comprise a bolometer.

12. The sensor according to claim 9, wherein the comparison means comprises a comparator followed by an inverter, the comparator receiving the reference voltage on its positive input, the grid of the PMOS transistor and the input of the counter being coupled to the output of the inverter.

13. The sensor according to claim 1, wherein the sensor comprises a reading circuit of a bolometer.

14. An infrared image sensor, comprising a plurality of pixels, each pixel comprising at least one sensor according to claim 13.

15. A counting method of the number of pulses x of a signals produced by an electronic sensor for a given capture time, such that $a'<x<b'$, where $a'$, $b'$ and $x$ are non-null natural integers, comprising at least the following steps:

applying the signals to an input of counting means comprising a maximum counting capacity equal to $z$ such that $(b'-a')\leq z<a'$, where $z$ is a non-null natural integer; incrementing the counting means with each pulse received on the input and resetting the counting when the maximum counting capacity $z$ is exceeded; and outputting from the counting means the number which is representative of the number of pulses $x$ of the signals, wherein $a'$ is the minimum value and $b'$ is the maximum value of the number of pulses that can be produced by the electric sensor.

* * * * *